(12) United States Patent
Liu et al.

(10) Patent No.: US 8,406,546 B2
(45) Date of Patent: Mar. 26, 2013

(54) ADAPTIVE ENTROPY CODING FOR IMAGES AND VIDEOS USING SET PARTITIONING IN GENERALIZED HIERARCHICAL TREES

(75) Inventors: Wei Liu, San Jose, CA (US); Mohammad Gharavi-Alkhansari, Santa Clara, CA (US)

(73) Assignee: Sony Corporation, Tokyo (JP)

( * ) Notice: Subject to any disclaimer, the term of this patent is extended or adjusted under 35 U.S.C. 154(b) by 350 days.

(21) Appl. No.: 12/758,981

(22) Filed: Apr. 13, 2010

(65) Prior Publication Data

US 2010/0310185 A1      Dec. 9, 2010

Related U.S. Application Data

(60) Provisional application No. 61/185,568, filed on Jun. 9, 2009.

(51) Int. Cl.
*G06K 9/36*        (2006.01)

(52) U.S. Cl. ........................................ 382/239

(58) Field of Classification Search .......... 382/232–233, 382/236, 238, 240, 243, 248, 250; 341/50, 341/79, 107; 348/394.1–395.1, 400.1, 403.1, 348/408.1, 420.1–421.1; 375/240.12, 240.18–240.2, 375/240.24–240.25
See application file for complete search history.

(56) References Cited

U.S. PATENT DOCUMENTS

| | | | |
|---|---|---|---|
| 5,315,670 A | 5/1994 | Shapiro | |
| 5,982,938 A | 11/1999 | Dube | |
| 6,269,192 B1 | 7/2001 | Sodagar et al. | |
| 6,289,131 B1 | 9/2001 | Ishikawa | |
| 6,775,412 B1 * | 8/2004 | Nister et al. | 382/243 |
| 7,085,425 B2 | 8/2006 | Christopoulos et al. | |
| 7,221,804 B2 | 5/2007 | Atsumi et al. | |
| 7,528,750 B2 | 5/2009 | Kim et al. | |
| 7,920,750 B2 * | 4/2011 | Bossen | 382/240 |
| 2006/0133680 A1 | 6/2006 | Bossen | |

FOREIGN PATENT DOCUMENTS

| | | |
|---|---|---|
| EP | 1037468 A1 | 9/2000 |
| EP | 857389 B1 | 8/2005 |
| WO | 2006068957 A1 | 6/2006 |

OTHER PUBLICATIONS

Wallace, G.K. et al.—"The JPEG Still Picture Compression Standard"—IEEE Transaction on Consumer Electronics, vol. 38, pp. xviii-xxxiv, Feb. 1992.

Shapiro, J.M.—"Embedded Image Coding Using Zerotrees of Wavelet Coefficients"—IEEE Transactions on Image Processing, vol. 41, pp. 3445-3462, Dec. 1993.

(Continued)

*Primary Examiner* — Jose Couso
(74) *Attorney, Agent, or Firm* — John P. O'Banion

(57) ABSTRACT

Adaptive entropy encoding and decoding utilizing set partitioning within generalized hierarchical trees which is applicable to both embedded and non-embedded encoding. After decorrelation and quantization during encoding, a tree structure is selected from multiple candidates, based on geometric relationships within the image block, for coding the coefficients toward improving coefficient zero clustering. The tree structure has leaf and non-leaf nodes in a specified arrangement, with leaf nodes containing coefficients associated with each non-leaf node. By proper tree selection, the number of zero clustered coefficients which may be eliminated from the encoded output stream is increased. During decoding, a tree structure compatible with the encoding for the current block is used for decoding the existing coefficients from the symbol stream and restoring missing zero coefficients.

20 Claims, 7 Drawing Sheets

OTHER PUBLICATIONS

Said, A. et al.—"A New, Fast and Efficient Image Codec Based on Set-Partitioning in Hierarchical Trees"—IEEE Transactions on Circuits and Systems for Video Technology, vol. 6, pp. 243-250, Jun. 1996.

WIPO, counterpart PCT Application No. PCT/US2010/037790, International Publication No. WO 2010/144461 dated Dec. 16, 2010, including international search report and written opinion issued on Feb. 18, 2011, pp. 1-46.

WIPO, related PCT Application No. PCT/US2010/037837, International Publication No. WO 2010/144497 dated Dec. 16, 2010, including international search report and written opinion issued on Feb. 18, 2011, pp. 1-64.

European Patent Office, Extended European Supplementary Search Report (ESSR) issued on Dec. 5, 2012 in related International Patent Application No. 10786702.0/2223/2406958 (pp. 1-7), corresponding International Patent Application No. PCT/UC2010037790, with claims examined (pp. 8-11) pp. 1-11.

Areekul, V. et al.—"Directional Zerotrees Image Coding"—Signals, Systems & Computers, 1997. Conference Record of the Thirty-first Asilomar Conference on Pacific Grove, CA, Nov. 2, 2007, IEEE Comput. Soc., vol. 1, pp. 684-688.

* cited by examiner

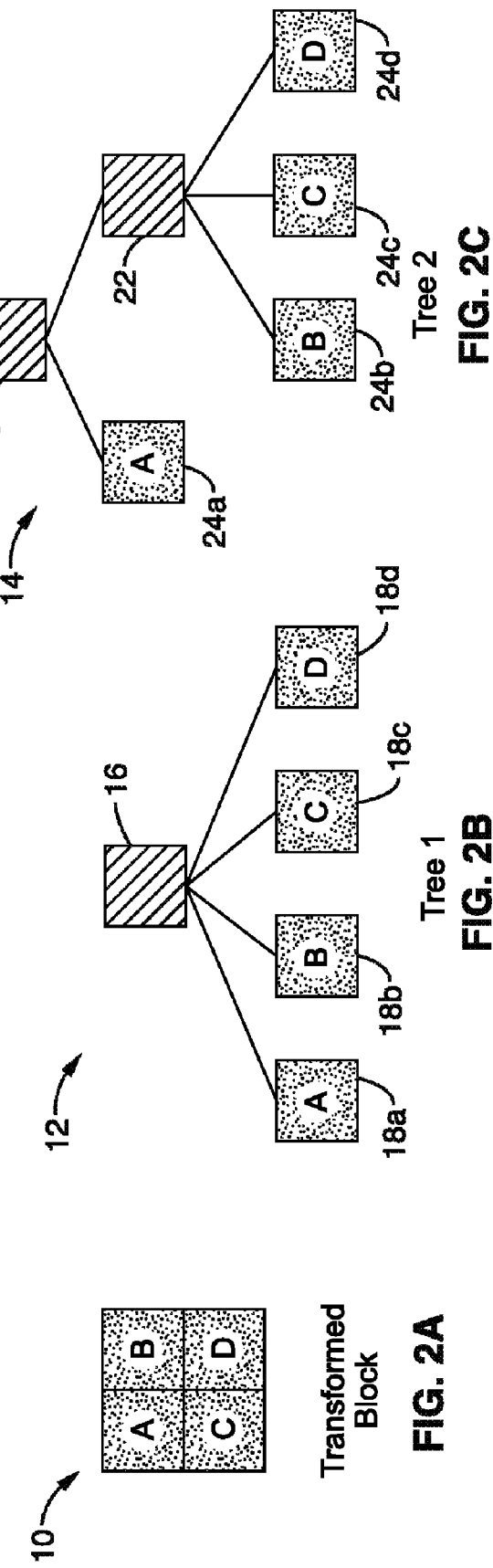

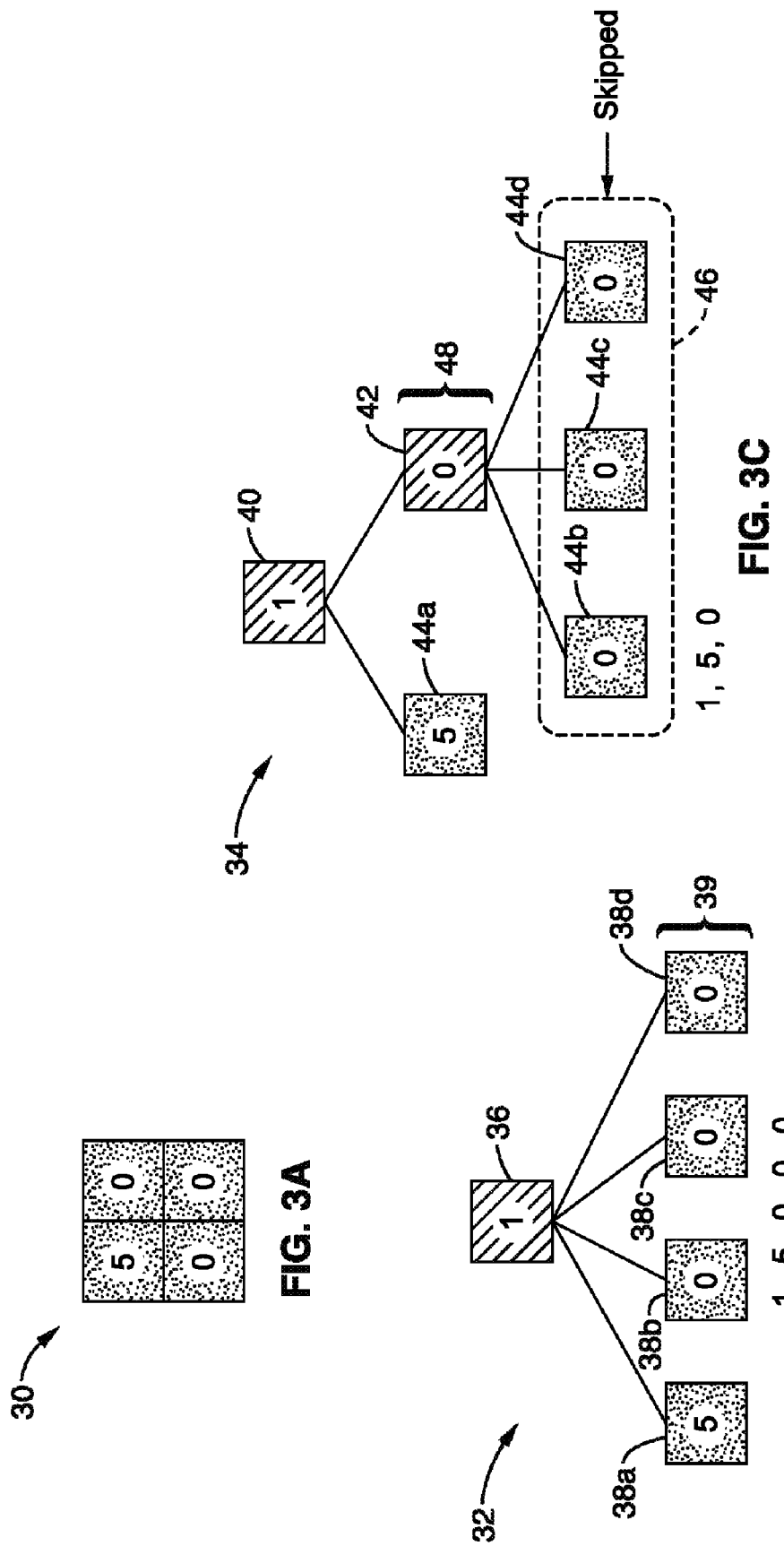

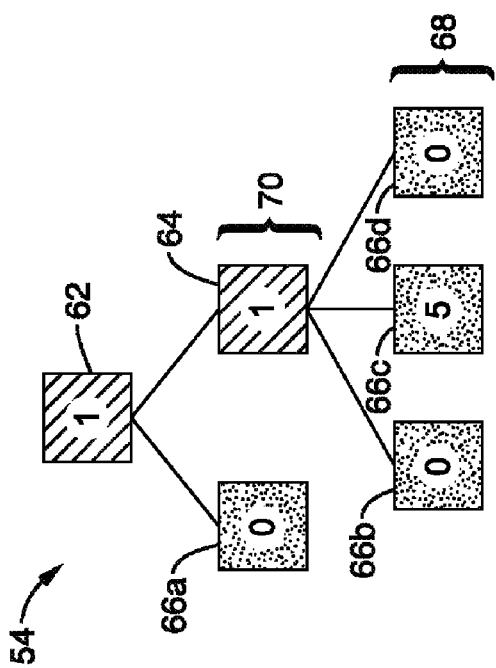
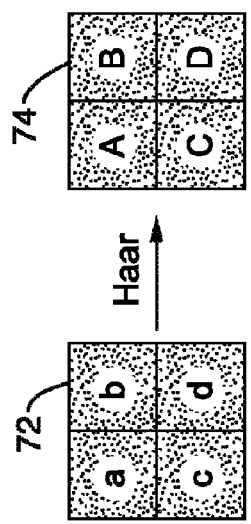
FIG. 4A
FIG. 4B
FIG. 4C
FIG. 5

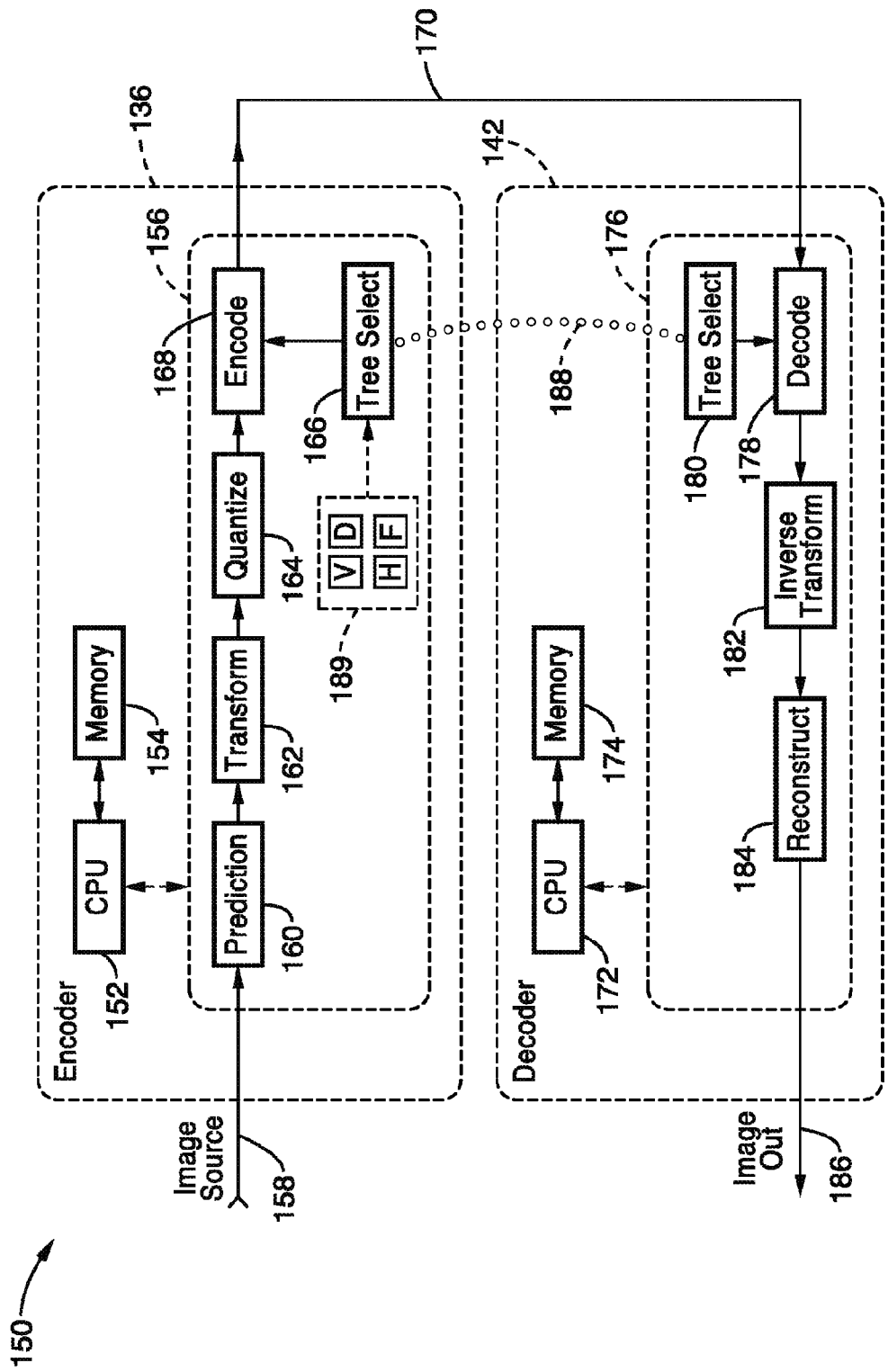

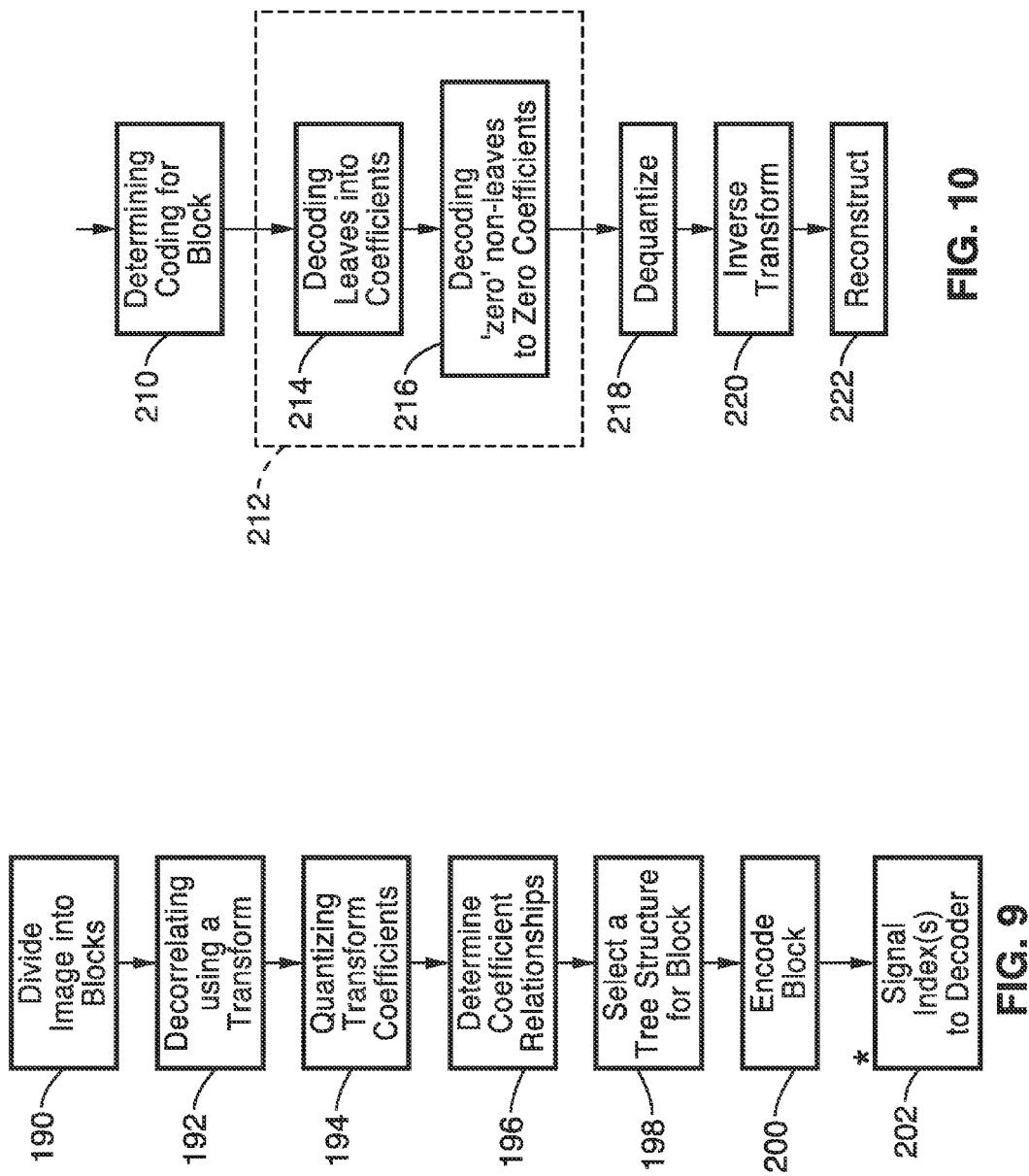

ADAPTIVE ENTROPY CODING FOR IMAGES AND VIDEOS USING SET PARTITIONING IN GENERALIZED HIERARCHICAL TREES

CROSS-REFERENCE TO RELATED APPLICATIONS

This application claims priority from U.S. provisional application Ser. No. 61/185,568 filed on Jun. 9, 2009, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to image and video coding, and more particularly to an adaptive entropy coding apparatus and method utilizing set partitioning in generalized hierarchical trees.

2. Description of Related Art

Entropy coding is an important constituent of image and video compression, which is usually in response to the steps of (1) performing a transform (or optionally prediction prior to the transform), (2) quantization, and (3) entropy coding.

The following is described for the common JPEG entropy coding method, which stands for Joint Photographic Experts Group and is an ISO/IEC standard for a suite of computer image file compression techniques. A JPEG file is created by choosing from a range of compression qualities, or more accurately, from one of a number of compression algorithms. In converting an image through JPEG compression the target size or quality of the resultant image is specified to a quality level that approximates or is less than the original image. As the highest quality images result in the largest file, a trade-off is made between image quality and file size. The JPEG scheme according to the standard includes twenty-nine (29) distinct coding processes although a JPEG implementer may not use them all.

When performing entropy coding in JPEG, each 8×8 block is transformed using discrete cosine transforms (DCT), and the DCT coefficients are quantized, zig-zag scanned, and run-length coded. It will be recognized that run-length coding provides a way of encoding DCT coefficients at lower rates by creating linear groups of identical pixels rather than storing the values of each pixel individually. DCT provides a mechanism for expressing any waveform as a weighted sum of cosines, and it is central to numerous forms of signal processing, in particular that of image and video compression.

FIG. 1A illustrates an example of zig-zag scanning in a 4×4 block, with coefficient locations shown in FIG. 1B. A number of drawbacks exist for performing JPEG's entropy encoding according to this zig-zag pattern. In particular, there is (1) a lack of rate control mechanisms, while the (2) zig-zag scanning destroys the 2-D dependencies of the DCT coefficients, and (3) the fixed zig-zag scanning is based on the statistics of a large set of image data, therefore is not adaptive to the local characteristics (e.g., directionality) of the local image block.

It should be understood that the parameters used in quantization partially determine rate control, whereby different quantization parameters typically have to be tried to attain the desired file size.

Bit-plane based entropy coding is widely utilized in scalable image/video coding. In this process, transform coefficients are converted to the binary form, and coded from the most significant bit-plane (MSB) to the least significant bit-plane (LSB). During this process the encoding and decoding of lower bit-planes is based on a knowledge of higher bit-planes. The bitstream coding process can be stopped anywhere, toward satisfying a given bitrate budget while providing a reasonably good reconstruction quality. The ability to stop at any point in the coding process is possible since the most important part of each coefficient (MSBs) has been already coded. This bitstream coding mechanism is known as embedded coding and provides good rate control.

Regarding the loss of 2-D dependency, it will be seen for example, that coefficient locations 2 and 6 in FIG. 1B are close in frequency spectrum as shown in the 4×4 block, yet they are not adjacent and are actually far from one another in response to the zig-zag scanning order shown in FIG. 1A. For certain type of blocks, if coefficient location 2 is non-zero, there is a high probability that 6 is non-zeros as well; in this case, the zig-zag scanning could potentially interrupt a long run and decrease the coding efficiency.

To improve the coding efficiency of 2D visual signals such as images and videos, adaptation to local geometric features is a recent trend. However, these methods have not been well associated to suitable entropy coding methods, whereby statistical redundancy is not fully exploited. By contrast, the present invention, illustrates the importance of designing adaptive entropy coding methods.

Accordingly, a need exists for a method and apparatus for performing rate controllable entropy encoding and decoding which has low complexity and high efficiency. These needs and others are met within the present invention, which overcomes the deficiencies of previously developed entropy-based image/video coding techniques.

BRIEF SUMMARY OF THE INVENTION

The present invention provides an adaptive entropy coding method for images and videos which utilizes set partitioning within generalized hierarchical trees. For the sake of simplicity of description, the Set PaRtitioning in Generalized Hierarchical Trees is referred to herein by the acronym "SPRIGHT". The SPRIGHT encoding method may be utilized for embedded coding as it shares similar features while it can provide rate controllability.

SPRIGHT coding follows the general steps of dividing an image (or a video frame) into blocks, decorrelating each block using a transform (optionally there could be prediction prior to the transform), quantizing the transform coefficients, choosing a tree from a set of multiple trees (i.e., pre-defined set of trees) and encoding the block using that chosen tree. Coding efficiency is greatly improved as the tree is not fixed but chosen in response to the 2D relationships which exist within the block of coefficients.

The invention is amenable to being embodied in a number of ways, including but not limited to the following descriptions.

One embodiment of the invention is an apparatus for adaptive entropy encoding within an image or video encoder, comprising: (a) a computer configured for image/video encoding; (b) memory coupled to the computer; and (c) programming executable on the computer for performing the steps of: (c)(i) dividing an image or a video frame into blocks (e.g., block can be of any desired shape and size, including 4×4, 8×8 and 16×16, 32×32), (c)(ii) (after optional prediction from reconstructed blocks) decorrelating each block using a transform (e.g., spectral transform), (c)(iii) quantizing the transform coefficients, (c)(iv) selecting a desired tree structure from multiple candidates in response to determination of geometric relationships within the block of pixels for the image, which is sometimes equivalent to the relationship between the transform coefficients of the block, and (c)(v) encoding the block using clustering of zero coefficients in response to the selected tree structure. In the above it will be appreciated that a portion of the zero coefficients are eliminated from the encoded output in response to having non-leaf nodes of the selected tree structure represent that their respective leaf nodes contain only zero coefficients and not coding these descendent leaf nodes into an output bit stream generated by the apparatus when encoding the image/video.

In at least one embodiment of the invention, the encoding of the block into the selected tree structure is performed according to a predetermined traversal of the tree structure, such as using a breadth-first traversal (BFT) approach. The phrase "predetermined traversal" being used herein to denote a pattern of how a process progresses through the nodes of a given tree. Using a predetermined traversal, the decoder can follow the same pattern through the tree as was used for encoding, so that the transform coefficients are decoded into the same order as they were encoded. Alternatively, the encoder and decoder can use any desired mechanism, without departing from the teachings of the present invention, to synchronize the order of decoding with the order of encoding.

It will be noted that each of the multiple candidate tree structure are configured with both leaf and non-leaf nodes having a specified arrangement, with one or more leaf nodes containing coefficients associated with each non-leaf node. In at least one implementation of the invention, the state of each non-leaf node is represented by a bit indicating whether its descendent leaf nodes contain all zero coefficients, or do not contain all zero coefficients (e.g., 0=leaf nodes are all zero, 1=leaf nodes coefficients are not all zero). In one mode of the invention, a set of tree structures are retained in the encoder and configured for allowing one of the tree structures to be selected for coding of the block. Various geometric relationships can be recognized within the blocks, such as flat, noisy, horizontal, vertical, diagonal +45°, diagonal −45°, and others as desired without departing from the teachings of the present invention. Such geometric relationships can be equivalently translated into two-dimensional relationships between the transform coefficients in the block being coded.

In at least one implementation, the encoder provides information to a decoder about which tree structure was selected for use in coding each block of the image or the video frame, and optionally which transform was used when decorrelating blocks of the image/video if one of multiple transforms are being selected. By way of example and not limitation, an index may be communicated to a decoder for passing information about which tree structure was selected and optionally which transform was utilized. Although the signaling of the transform/tree structure consumes overhead bits, the overhead bit-rate can be reduced by coding the signaling, such as in response to arithmetic coding.

At least one implementation of the invention further comprises performing inter-block prediction or pre-filtering of the block prior to performing transform.

Embodiments of the invention can be configured for non-embedded or embedded encoding in which the encoding is performed across any desired number of bit planes and can be stopped at any desired coding rate.

One embodiment of the invention is a system for adaptive entropy encoding and decoding of images or videos, comprising: (a) an encoder having a processing element and memory configured for image/video encoding; (b) programming executable on the encoder processing element for performing the steps of: (b)(i) dividing an image or a video frame into blocks, (b)(ii) (after optional prediction from reconstructed blocks) decorrelating each block using a transform, (b)(iii) quantizing the transform coefficients, (b)(iv) selecting a tree structure from a set of multiple candidates in response to determination of geometric relationships within the block, and (b)(v) encoding the block using clustering of zero coefficients in response to use of a tree structure as selected from multiple candidates; and (c) a decoder having a processing element and memory configured for image/video decoding of the image/video bit-stream from the encoder; (d) programming executable on the decoder processing element for outputting an image/video signal in response to performing the steps of: (d)(i) determining the tree structure selected by the encoder in encoding the block, (d)(ii) decoding leaves of the tree structure into coefficients of an output, (d)(iii) outputting zero coefficients within the output in response to decoding non-leaf nodes without non-zero branches, (d)(iv) performing dequantizing of the output, (d)(v) performing inverse transform of the output, and (d)(vi) reconstructing the image or video signal in response to receipt of the output. In the encoding process a portion of the zero coefficients are eliminated from the output in response to having non-leaf nodes representing that respective leaf nodes contain only zero coefficients. The decoding process uses the same tree structures selected during encoding to properly interpret the symbols for each block.

One embodiment of the invention is a method for adaptive entropy encoding within an image/video encoder, comprising: (a) dividing an image or a video frame into blocks; (b) (after optional prediction from reconstructed blocks) decorrelating each block using a spectral transform; (c) quantizing the transform coefficients; (d) selecting a tree structure from multiple candidates in response to determination of two-dimensional relationships within the block of coefficients for the image/video; and (e) encoding the block while clustering zero coefficients in response to the selected tree structure. From the above, it should be appreciated that a portion of the zero coefficients are eliminated from the encoded output in response to having non-leaf nodes of the selected tree structure represent that its respective leaf nodes contain only zero coefficients.

One embodiment of the invention allows both the encoder and the decoder to adapt one or more tree structures of the candidate trees based on the statistics of previously decoded image/video blocks; and the adaptation is done in a way that when processing a certain block, the encoder and decoder always have the same set of candidate trees.

The present invention provides a number of beneficial elements which can be implemented either separately or in any desired combination without departing from the present teachings.

An element of the invention provides image/video coding with high coding efficiency.

Another element of the invention is encoding and decoding which provides high coding efficiency in response to clustering of zero coefficients in the selected tree structure and skipping clustered zero coefficients in the encoded output stream.

Another element of the invention is encoding and decoding which does not rely on a fixed tree structure for encoding/decoding each of the blocks.

Another element of the invention is the inclusion of inter-block or inter-frame prediction before decorrelating the image/video block.

Another element of the invention is selecting one decorrelation transform operation from multiple possible transform operations (e.g., DCT, DWT, overlapped transforms, or directional transforms).

Another element of the invention is encoding which selects a tree structure from multiple candidates based on the geometric relationships within the block being coded at the time.

Another element of the invention is encoding and decoding in response to a predetermined traversal of the tree structure.

Another element of the invention is encoding and decoding in which the predetermined traversal of the tree structure comprises performing a breadth-first traversal (BFT).

Another element of the invention is communicating information to a decoder about which decorrelation transform and/or which tree structure were utilized during encoding.

Another element of the invention is the signaling of the transform/tree structure, as well as the coded bitstream allow further reduction of bit-rate, such as by utilizing arithmetic coding.

A still further element of the invention is an encoding and decoding method which can be utilized within both embedded and non-embedded image coding systems.

Further elements of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 1A-1B are coefficient block arrays showing a zig-zag scanning order in FIG. 1A and coefficient locations in FIG. 1B.

FIG. 2A-2C are coefficient data diagrams of a transformed block of four coefficients (A-D) in FIG. 2A, and tree hierarchies in FIG. 2B-2C which can be selected for the block according to an element of the present invention.

FIG. 3A-3C are coefficient data diagrams of a coefficient block and tree hierarchy operations selected for the block according to an element of the present invention.

FIG. 4A-4C are coefficient data diagrams of a slightly different coefficient block from FIG. 3A, and its associated tree hierarchy operations selected for the block according to an element of the present invention.

FIG. 5 is a coefficient block array upon which a Haar transform is performed for decorrelation of the block.

FIG. 8 is a block diagram of an encoder-decoder system, showing computer processors and memory configured for performing the adaptive entropy encoding and decoding according to an embodiment of the present invention.

FIG. 9 is a flowchart of an adaptive entropy encoding method according to an embodiment of the present invention.

FIG. 10 is a flowchart of an adaptive entropy decoding method according to an embodiment of the present invention.

DETAILED DESCRIPTION OF THE INVENTION

Figure 6B:
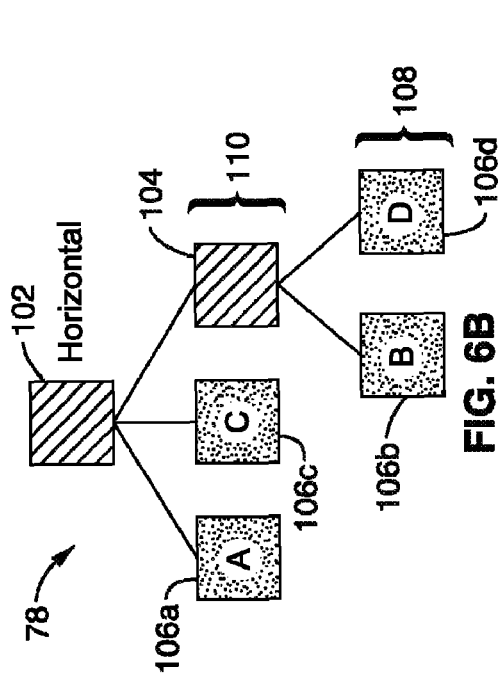
FIG. 6A-6D are coefficient data diagrams showing multiple tree hierarchy structures which can be selected according to an element of the present invention.

Referring more specifically to the drawings, for illustrative purposes the present invention is embodied in the apparatus generally shown in FIG. 2A through FIG. 10. It will be appreciated that the apparatus may vary as to configuration and as to details of the parts, and that the method may vary as to the specific steps and sequence, without departing from the basic concepts as disclosed herein.

1. Introduction.

Adaptive entropy encoding and decoding apparatus and methods are described which utilize set partitioning within generalized hierarchical trees for the encoding and decoding of images or videos. By way of example and not limitation, the apparatus and method is generally referred to by the acronym "SPRIGHT", for "Set PaRtitioning in Generalized Hierarchical Trees".

An image or a video frame is divided into blocks, with each block (optionally predicted from previously reconstructed blocks, and) decorrelated using a transform, its transform coefficients quantized, and a tree is selected from multiple candidates (e.g., from a set of pre-defined trees) in response to the geometric relationship within the block, or more particularly selection is performed in response to the two-dimensional (2D) relationships between the coefficients in the block. The block is then encoded in response to the selected tree structure. Coding efficiency is greatly improved as the tree is not fixed but is chosen in response to the 2D relationships which exist within the block of coefficients.

It should be appreciated that the image or the video frame may be divided into blocks in a number of different ways without departing from the teachings of the present invention. For example, the blocks may be configured in any arbitrary shape or size, they need not be square or regular shaped. Each block may contain either singular or multiple color components. The blocks can be overlapped with each other, if in combination with an overlapped transform. Less preferably, a block may comprise an entire image or video frame.

Before performing the transform, it will be appreciated that inter-block prediction or pre-filtering can be performed, however, it is not required.

Each block of the image or video frame is then processed according to the following encoding steps. Values within the block are decorrelated using a transform, for instance a discrete cosine transform (DCT), discrete wavelet transform (DWT), or other transforms which provide decorrelation. It should be appreciated that according to one implementation of the present invention, different types of transforms may be utilized within the same image or video frame. If different types of transforms are utilized, then the type of transform used for the block should be communicated to the decoder, such as by signaling the decoder in response to the state of one or more bits being encoded for each block.

The transform coefficients within the block are then quantized. It should be appreciated that the quantization step will quantize all coefficients to zero which are below a desired quantization threshold.

A tree structure is then chosen from multiple candidate tree structures for each block. Tree structure selection is preferably made from a set of pre-defined trees in response to the relationships (e.g., two-dimensional) between the coefficients within each block, and each block is then encoded using the chosen tree structure.

It should be appreciated that the tree structure used for coding is not fixed for all given blocks, but is selected based on the spectral features of the specific block being coded, whereby coding efficiency can be significantly improved. Optionally, both the encoder and the decoder can adapt the tree structure(s) based on the statistics of previously decoded blocks; with adaptation performed so that when processing a certain block, both the encoder and decoder have the same set of candidate trees.

The index of the chosen tree should be signaled to the decoder to allow the decoder to determine which tree structure was selected when the block was encoded.

It should be appreciated that there is typically a relationship between the transform used and the tree structure which is selected. Accordingly, in many implementations the encoder would send one index to denote the (transform, tree) pair, which allows the (transform, tree) to be jointly optimized.

The indices of the tree structure and/or the transform require utilizing some overhead bits. It should be appreciated that the amount of overhead is preferably reduced by applying a coding technique, such as arithmetic coding, to the indices.

2. Tree Structure in SPRIGHT.

FIG. 2A-2C illustrate a transformed 2×2 block and multiple tree structures shown by way of example and not limitation. It should be recognized that the invention may be applied to any sized block without departing from the teachings of the present invention. For the sake of simplicity, FIG. 2A depicts a small 2×2 transformed block 10, having coefficients A-D. Typically, block sizes range from 4×4, 8×8 and 16×16, 32×32, and so forth, although the block may be configured in any desired shape and size.

In the present invention, a tree is considered a data structure for facilitating encoding and decoding. It is defined with leaf nodes (terminal nodes) connected from non-leaf nodes (non-terminal nodes). Each leaf node represents a coefficient from the block, while each non-leaf node represents a group of coefficients, and more particularly the set of all of its descendents. The non-leaf node known as the root comprises the set of all coefficients for the given block.

FIG. 2B-2C exemplify two possible tree structures for the transformed block shown in FIG. 2A. In tree 12 of FIG. 2B a single non-leaf node 16 is shown, which is also the root of the tree, from which four coefficients A-D 18a-18d are directly grouped. In tree 14 of FIG. 2C a non-leaf node 20 is shown, which is also root 20 from which are associated a leaf node A (24a) and another non-leaf node 22, which associates three leaf nodes B, C and D (24b, 24c, 24d). Thus, in FIG. 2B all the coefficients are grouped together at once, while in FIG. 2C coefficients B-D are grouped together at the lowest level.

3. SPRIGHT Encoding with a Tree.

The following examples consider the encoding using a non-embedded version of the present invention. A breadth first traversal (BFT) of the tree is preferably performed, and the outputs are controlled in response to the type of node and coefficient value. If the current node is a leaf, then the value of the coefficient is output. It should be appreciated that the coefficient value is preferably non-binary, and can be coded for example with arithmetic coding. Non-leaf nodes contain one or more leaf nodes, and by way of example are marked with a 1 if at least one descendent leaf has a non-zero coefficient, or marked as 0 if the corresponding set of coefficients are all zeros, whereby all the descendent nodes are skipped. "Skipping" of the descendent nodes means that these nodes are not explicitly encoded into the encoded output stream of bits, thus saving coding space for these zero coefficients. It will be recognized that although the values of 1 and 0 are used for simplicity of explanation for non-leaf node values, any desired values may be utilized for indicating whether or not non-zero descendents exist for a non-leaf node.

FIGS. 3A-3C and 4A-4D illustrate encoding of 2×2 blocks having similar geometries. By way of example and not limitation, descendents in non-leaf nodes is represented in binary, with "1" indicating that at least one branch has a non-zero coefficient, and "0" indicating that none of the branches have non-zero coefficients.

FIG. 3A depicts a block 30 having four coefficients 5, 0, 0, 0. FIG. 3B depicts selecting a first encoding 32 for block 50 which has a single non-leaf node 36 and four leaf nodes 38a-38d in a single level 39. The output of the coding in FIG. 3B generates a sequence of five values 1, 5, 0, 0, 0. Contrast this coding to that shown in FIG. 3C using a particular two-level tree structure. In the tree 34 of FIG. 3C, a root node 40 has a single leaf node 44a containing a coefficient of value 5, by way of example, and a non-leaf node 42 which clusters the zero nodes comprising three leaf nodes 44b, 44c and 44d in group 46. As these leaf nodes are all zeros, they may be skipped, whereby the respective root 42 is coded with a 0. In response to this coding, the output of this coding sequence is 1, 5, 0; which is of course shorter than the coding used in FIG. 3B. The small 2×2 block sizes are shown by way of example, and it should be appreciated that larger block sizes can provide higher levels of coding efficiency increase. In addition, it should be appreciated that although the coefficients are depicted as single-digit integers for the sake of illustration, the actual coefficients require a much larger representational bit-space.

However, if the relationship between the coefficients in the block are slightly different, such as depicted in the block of FIG. 4A, in which the position of one of the coefficients has been moved, then coding efficiency with respect to tree structure is dramatically altered. FIG. 4A depicts a block 50 having four coefficients 0, 0, 5, 0. FIG. 4A depicts encoding in response to a first selected tree structure 52 having a single non-leaf node 56 and four leaf nodes 58a-58d in a single level 60. The output of this coding generates a sequence of five values 1, 0, 0, 5, 0. In FIG. 4C a different tree structure 54 is chosen, having a root 62, with a leaf 66a (0 coefficient) and a non-leaf 64 on a first level 70, and a second level 68 with leaves 66b (0), 66c (5) and 66d (0). In response to the non-zero value of the coefficient in leaf 66c, the group of coefficients cannot be skipped without introducing error, and non-leaf 64 is coded with a 1 indicating that its leaves must be included in the coding. The coding using this tree generates six outputs 1, 0, 1, 0, 5, 0, and is less efficient than that of FIG. 4B.

From the above discussion it is apparent that use of a tree structure which does not fit the geometric relationships within the block leads to inefficient block coding. The present invention provides for properly selecting a tree structure from multiple candidates for any given block toward assuring efficient coding of that block.

4. SPRIGHT Decoding with a Tree.

In decoding of the image blocks, the decoder must determine how the blocks were determined and select the proper tree structure from multiple candidate tree structures. The decoder preferably receives information about which tree structure was used for encoding each block, for example receiving an index to the tree structure used during encoding. Once the proper tree is selected from multiple candidate trees, the tree is traversed during decoding using a technique which is compatible with the encoding process, for example utilizing a breadth first traversal (BFT) of the tree. If the current node is a leaf of the tree, then a symbol is decoded from the bitstream, and the value of the decoded symbol is assigned to the corresponding coefficient. Conversely, if the current node is not a leaf, then one bit is read from the bitstream and operated upon; if the bit is a 1, then the processing continues, but if a 0, then the values of all descendent nodes of the current node are set to be 0 and they are dropped from the tree.

5. Zero Clustering.

In can be seen from the preceding discussions, that the coding gain of the present invention is mainly derived in response to zero-clustering, wherein the zeros produced from transform coding are clustered into a group with a single zero in their respective non-leaf node. Conversely, if zeros can only be partitioned with non-zeros, then no bit saving are obtained.

It is well recognized that transform coding usually produces a lot of zeros, and that these zeros may be neighbors of each other. These coefficients may be neighbors in a number of different ways, including with regard to (1) spatial location whereby they may be neighboring coefficients in the same DWT subband; or (2) spectral location whereby they may be neighboring DCT coefficients.

The present invention makes use of this distinction by selecting a particular tree structure for each block based on the relationship of the coefficients within the block.

6. Tree Design.

This section illustrates different tree structures which can be used for different blocks being coded.

FIG. 5 illustrates performing a Haar transform on a block of pixels prior to selecting a tree structure for coding the block. It should be appreciated that other block transforms (e.g., DCT) can be used which provide similar results without departing from the teachings of the present invention. In the simple 2×2 example shown, the resultant coefficients A-D of block 74 are generated in response to pixels a-d from block 72 as follows:

$A=(a+b+c+d)/2$ $B=(a-b+c-d)/2$ $C=(a+b-c-d)/2$ $D=(a-b-c+d)/2$

Consider the following patterns of blocks:
A. The block is flat.
a≈b≈c≈d→B,C,D are likely to be zeros after quantization.
B. The block is horizontally edged.
a≈b, c≈d→B,D are likely to be zeros after quantization.
C. The block is vertically edged.
a≈c, b≈d→C,D are likely to be zeros after quantization.
D. The block is noisy.
There are few zeros among {A,B,C,D}.

In the above, one can discern certain geometric relationship between pixels which can be translated into 2D relationships between transform coefficients. By the same approach above it should be appreciated that other geometric relationships can be recognized within the blocks, such as diagonal-1 (e.g., +45°), diagonal-2 (e.g., −45°), and so forth, especially in view of the use of block sizes which extend beyond the small 2×2 block sizes used herein by way of example.

FIG. 6A-6D illustrate four example tree structures which can be selected in response to the spectral patterns found within the blocks. It should be appreciated that the tree structure can differ for different block sizes and different transforms. These tree structures can be determined on or off-line as desired. If created off-line, then they are stored and selected for use based on the geometric patterns in the block, while if created on-line they must be created based on past statistics of reconstructed blocks to avoid sending the tree structure as side information to the decoder. Off-line creation is probably the more preferred approach for the majority of applications, since it requires less computation in both encoding and decoding.

Figure 6D:
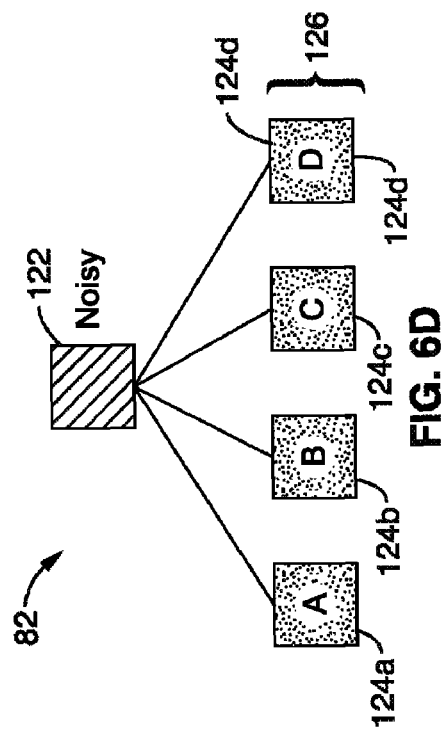
Figure 6A:
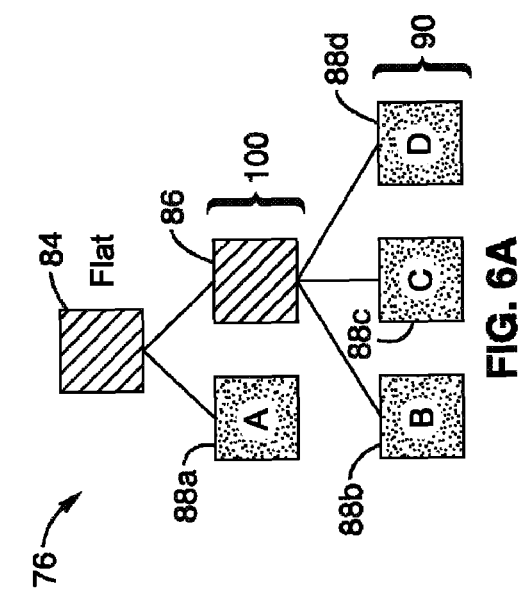

FIG. 6A depicts a tree 76 which is optimized for a flat geometry. Tree 76 has a root node 84, under which is a leaf node 88a (A) and a non-leaf node 86. Under non-leaf node 86 are three leaf nodes 88b (B), 88c (C), and 88d (D). Accordingly, two levels 90, 100 are under the root level 84.

FIG. 6B depicts a tree 78 which is optimized for a horizontal geometry. Tree 78 has a root node 102, under which are leaf nodes 106a (A), 106c (C) and a non-leaf node 104. Residing under non-leaf node 104 are two leaf nodes 106b (B) and 106d (D). Accordingly, two levels 108, 110 are under the root level 102.

Figure 6C:
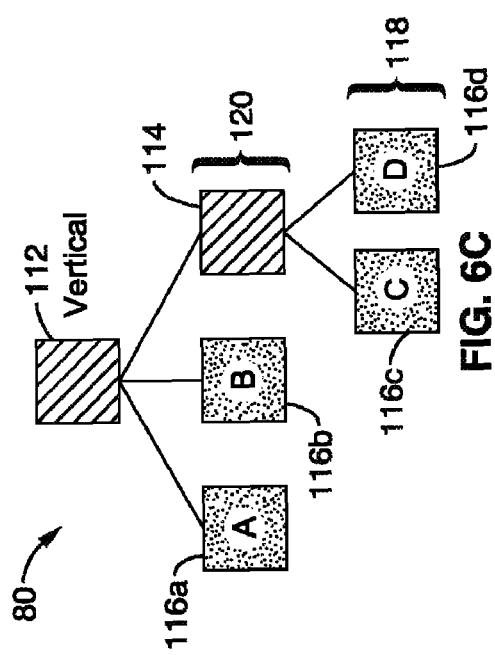

FIG. 6C depicts a tree 80 which is optimized for a vertical geometry. Tree 80 has a root node 112, under which are leaf nodes 116a (A), 116b (B) and a non-leaf node 114. Residing under non-leaf node 114 are two leaf nodes 116c (C) and 116d (D). Accordingly, two levels 118, 120 are under the root level 112.

FIG. 6D depicts a tree 82 which is optimized for a noisy block. Tree 82 has a single non-leaf (root) node 122 and four leaf nodes 124a-124d (A-D) at the same level 126.

7. SPRIGHT in Embedded Coding.

This section describes embodiments in which the present invention is utilized within embedded coding having any desired number of bit-planes. Suppose there are N bit-planes which are indexed as N−1, . . . , 2, 1, 0 (when considered from MSB to the LSB).

Initialization is performed on the bit planes, such as the following:

LIC=φ; (List of Insignificant Coefficients)

LIS=root; (List of Insignificant Sets)

LSC=φ; (List of Significant Coefficients)

k=N−1;

While k≧0, do
Threshold=$2^k$;
Process LIC;
Process LE;
Process LSC;
k=k−1;

Coding of the bit-planes can be stopped at any desired time, such as in response to depletion of the bit budget. It will be appreciated that the SPRIGHT apparatus and method according to the present invention can operate in either embedded or non-embedded mode, such as in a manner similar to that of other coding methods, including embedded zero-tree wavelet (EZW) and set partitioning in hierarchical trees (SPIHT).

The output coding of SPRIGHT according to an embodiment of the invention is preferably as a binary stream, which can be further coded using arithmetic coding, or simply sent as is. Sending the coding "as is" leads to a significant reduction in complexity while sacrificing only a small amount of coding efficiency. In addition, other forms of signaling between the encoder and the decoder can be performed, such as the transform type and/or tree index. The overhead represented by these additional signals can be reduced using a form of compression coding, such as the arithmetic coding already described.

Process list of insignificant coefficients (LIC).

```
for each coefficient x in LIC, do:
    If |x| < Threshold, output 0
    Otherwise, output 1; and
    Then output 1 if x > 0, or output 0 if x < 0 ;
    Delete x from LIC, add it to LSC .
```

Process list of insignificant sets (LIS).

```
for each set s in LIS, do:
    If |x| < Threshold holds for all x in s, output 0 ;
    Otherwise, output 1; and
    Delete s from LIS .
```

Process the offspring of s.

```
for each offspring o of s, do:
    If o is a leaf, do the same thing as processing LIC;
    If o is not a leaf, add it to LIS.
```

Process LSC.

```
for each coefficient x in LSC, do:
    If it is just added to LSC at the current bit-plane, skip it;
    Otherwise, output mod(|x| >> k, 2).
```

8. SPRIGHT Apparatus and Method Summarized.

Traditional approaches to entropy coding use a single algorithm for the coding, and thus do not select the form of encoding based on the geometry of the block being coded. It will be seen that conventional approaches perform encoding by relying on a fixed encoding method, such as utilizing a single fixed tree in EZW and SPIHT, for encoding the current block.

Figure 7:
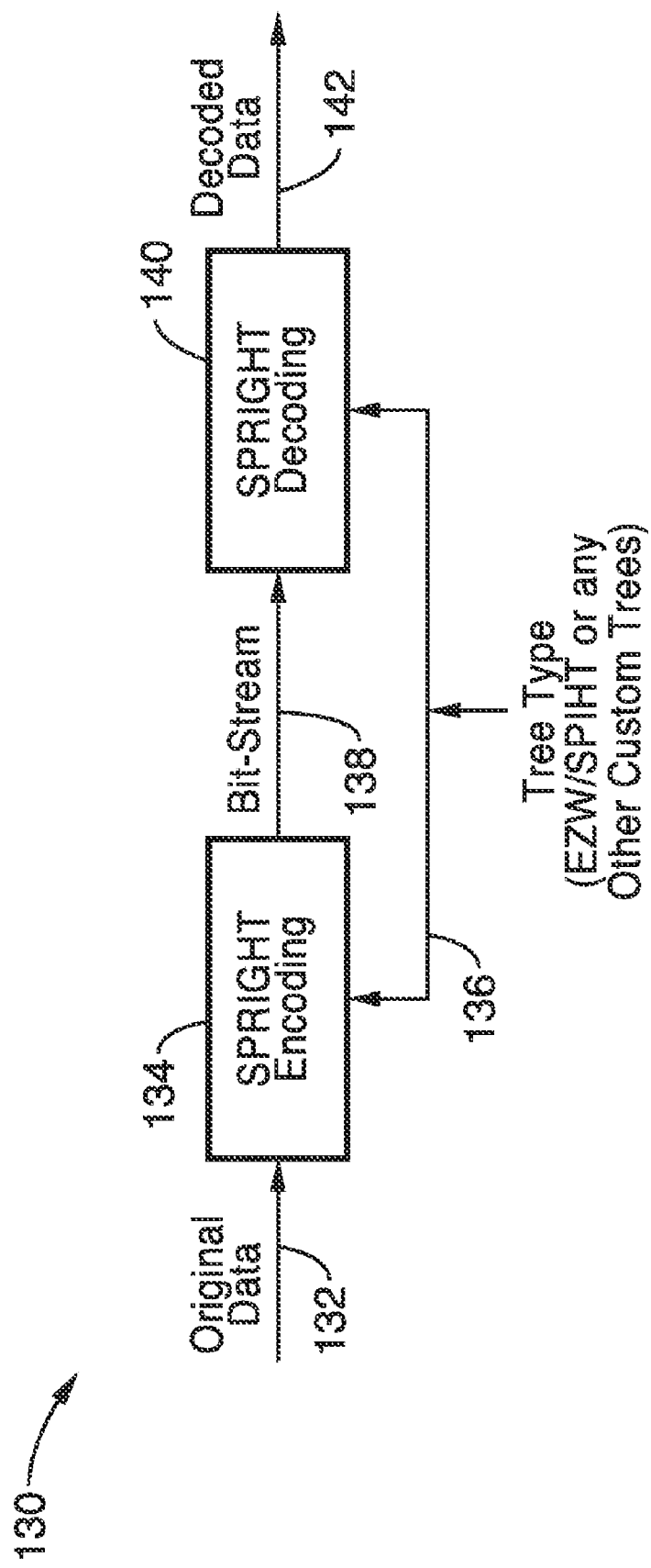
FIG. 7 is a block diagram of SPRIGHT encoding and decoding according to an embodiment of the present invention, showing tree type selection controlling both encoding and decoding processes.

FIG. 7 illustrates a simplified block diagram 130 of an encoder coupled to a decoder. Original image data 132 is received at an encoder apparatus 134 which receives a decision 136 on selection of tree type from multiple candidate trees. Although depicted as a separate signal, it will be appreciated that this selection signal function 136 is preferably performed as part of the encoder. The bit-stream output 138 from the encoder is received at a decoder 140 which also receives the tree type selection signal 136, and outputs decoded data 142. In the present invention, a general encoder apparatus and a general decoder apparatus are utilized for executing multiple tree-based coding operations in response to the geometry of the block being coded. The encoder and decoder as shown, select which tree structure to use in coding the block based on block geometry. It will be appreciated that SPRIGHT, in response to which tree is selected, can provide the same output as EZW/SPIHT or other known coding techniques for a given block.

It should be appreciated that embodiments of the present invention, also allow the use of non-traditional trees to improve coding efficiency. By way of example, tree structures can be configured that are adapted to the local statistics of the image data. Since the tree-structure is selected in response to the characteristics of the block, a tree-structure can be selected which is very specific for a given block, but which if used over a range of blocks could provide very inefficient coding.

FIG. 8 illustrates an embodiment 150 showing more detail of the encoder 136 and decoder 142. Encoder 136 is shown comprising a computer processor (CPU) 152 and memory 154. It should be appreciated that these processing components may be implemented singularly, or as multiprocessors, and/or with any desired level of acceleration hardware, without departing from the teachings of the present invention. Programming executable on processor 152 performs the encoding 156 of an image source 158, performing prediction 160, performing a transform 162, quantization 164, tree selection 166 and encoding 168 to output encoded image data (or signal) 170. Tree selection is performed more particularly in response to the two-dimensional relationships between the coefficients in the block, after which the block is encoded using the selected tree. Utilization of the selected tree structure can provide greatly increased coding efficiency over implementations in which the tree structure is inherent (fixed) within the coding algorithm used to perform the coding.

The decoder 142 is shown similarly implemented with processor element 172 and memory 174, and it may also comprise any desired processing components and combination with digital acceleration hardware without departing from the teachings of the present invention. In response to execution of programming, a decoding process 176 is performed in which signal 170 is received and decoded by a decoding block 178 which makes tree structure selection 180 prior to decoding. The output of the decoding block 178 is then inverse transformed 182 and the image is reconstructed as per block 184 to produce the final decoded image output 186.

A tree selection link 188 is shown between the tree selection during encoding and the tree selection used during decoding to represent an embodiment in which information about the chosen tree structure is communicated to decoder 142 to assure that it decodes the data in the manner in which it was encoded. Typically, information on the selected tree structure would be incorporated into predetermined bits of the encoded signal stream which is being sent to the decoder. It should also be appreciated that communication of tree structure for a given block may be communicated as bits from the encoder to the decoder, or alternatively the data from the encoder may be organized in a manner to inform the decoder of tree selection, or the decoder may otherwise determine a tree structure to use for decoding which is compatible with the encoding.

In the described example embodiment, the decoder always knows the tree structure used for coding a given block. For example, the tree structures are either pre-programmed into the executable of the decoder, or informed by the encoder at the beginning of a session. By way of example and not limitation, FIG. 8 depicts a set of multiple candidate tree-structures 189 (e.g., vertical (V), horizontal (H), Diagonal $1^{st}$ or $2^{nd}$ (D), and Flat (F), which can be selected. When doing a BFT, a decoder first distinguishes whether the current node is a leaf or not, then reads a BIT from the bitstream when it is a non-leaf, or reads a symbol from the stream for a leaf. A symbol may comprise one or more bits, depending on how it has been encoded, for example using exp-Golomb code.

FIG. 9 illustrates an embodiment of the encoding method according to the present invention. An incoming image is divided into blocks 190, and decorrelated using a selected transform 192, and quantized using transform coefficients 194. 2D relationships within the block are determined in step 196. A tree structure is selected at step 198 in response to the determined 2D relationship, which may be used separately, or optionally used in combination with additional information about other blocks or the image itself, such as image characteristics, in selecting the optimum tree to use for encoding the block as shown in step 200. It should be noted that the selection of a decorrelation transform and the selection of a tree structure from multiple candidates can be inter-related.

It will be appreciated that the encoding of the block based on the selected tree structure preferably follows a pattern within the tree that is compatible with the decoder, such as using a predetermined tree traversal pattern (not shown). For example, in at least one embodiment of the invention, a breadth-first traversal (BFT) of the tree structure is performed wherein coefficients fill each level of the tree in a given direction before proceeding downward to the next lower level. An optional step 202 is shown for communicating information about the selected tree structure, such as an index, to be utilized by the decoder.

FIG. 10 illustrates an embodiment of a decoding method according to the present invention. Prior to decoding the block, the decoder determines how the current block was coded 210, preferably based on receiving information from the encoder, such as an index, about which tree structure was used for encoding the current block. The decoding is performed following a pattern which is compatible with the encoding. In the present example embodiment, a breadth-first traversal (BFT) of the tree to all extant non-zero branches is performed 212; with leaves decoded into coefficients 214, and "zero" (empty) non-leaves decoded into zero coefficients 216. Once all coefficients are properly restored, the decoder proceeds with dequantization 218, inverse transform 220, and reconstruction 222.

The present apparatus and methods, referred to herein as SPRIGHT, provides entropy-based encoding and decoding for image/video data. During the coding process, a tree structure is chosen from multiple candidates, preferably based on the geometry of the block (or equivalently, the 2D relationships between the coefficients in the block) and the block is encoded in response to the selected tree. In the encoding process clusters of zero coefficients (i.e., turned to zero during quantization) can be eliminated from the encoded output. In the decoding process, the tree structure used by the encoder is determined, and the decoder converts the encoded data based on the selected tree structure, back into block coefficients, while replacing (restoring) the zero coefficients. In response to proper selection of tree structures, the overall coding efficiency of the system can be improved. The teachings of the invention can be applied to various image/video encoding and decoding systems and can be applied in both embedded or non-embedded modes. In an embedded mode, the invention provides a fully embedded bit-stream that can be stopped anywhere, and which can be utilized without complex entropy coding methods such as Huffman coding or arithmetic coding.

The present invention provides methods and apparatus for performing entropy coding and decoding within image/video processing devices. Inventive teachings can be applied in a variety of apparatus and applications, including both embedded and non-embedded image/video coding, and so forth.

As can be seen, therefore, the present invention includes the following inventive embodiments among others:

1. An apparatus for adaptive entropy encoding within an image or video encoder, comprising: a computer configured for image/video encoding; memory coupled to said computer; and programming executable on said computer for performing steps comprising, dividing an image or a video frame into blocks, decorrelating each block using a transform, quantizing the transform coefficients, selecting a desired tree structure from multiple candidates in response to determination of geometric relationships within the block of pixels for the image, and encoding the block using clustering of zero coefficients in response to the selected tree structure; wherein a portion of the zero coefficients are eliminated from the encoded output in response to having non-leaf nodes of said selected tree structure represent that respective leaf nodes contain only zero coefficients and not coding these descendent leaf nodes into an encoded output bit stream generated by said apparatus.

2. An apparatus as recited in embodiment 1, wherein said encoding of the block is performed in response to the selected tree structure according to a predetermined traversal of the tree structure.

3. An apparatus as recited in embodiment 1: wherein said tree structure has leaf and non-leaf nodes in a specified arrangement; and wherein one or more leaf nodes containing coefficients are associated with each non-leaf node.

4. An apparatus as recited in embodiment 1, wherein the state of each non-leaf node is represented by a bit indicating whether its descendent leaf nodes contain all zero coefficients, or do not contain all zero coefficients.

5. An apparatus as recited in embodiment 1, wherein a set of tree structures are retained in the encoder and configured for allowing one of the tree structures to be selected in response to said selection of tree structure.

6. An apparatus as recited in embodiment 1, wherein said geometric relationships which can be recognized within the blocks are selected from the group of geometric block relationships consisting of flat, noisy, horizontal, vertical, diagonal +45°, diagonal −45°.

7. An apparatus as recited in embodiment 1, further comprising programming executable on said computer for providing information to a decoder about which transform was used when decorrelating blocks of the image.

8. An apparatus as recited in embodiment 1, further comprising programming executable on said computer for providing information to a decoder about which tree structure was selected for use in coding each block of the image.

9. An apparatus as recited in embodiment 1, further comprising programming executable on said computer for: providing information to a decoder about which tree structure was selected for use in coding each block of the image; and wherein said information comprises communicating at least one index for said selected tree structure to a decoder configured for receiving the encoded image.

10. An apparatus as recited in embodiment 1, wherein said geometric relationship comprises a two-dimensional relationship between the coefficients in the current block being coded.

11. An apparatus as recited in embodiment 1, further comprising programming executable on said computer for inter-block prediction or pre-filtering of the block prior to transform.

12. An apparatus as recited in embodiment 1, wherein said block can be of any desired shape and size, including block sizes selected from the group of block sizes consisting of 4×4, 8×8 and 16×16, 32×32 coefficient blocks.

13. An apparatus as recited in embodiment 1, further comprising programming executable on said computer for performing the adaptive entropy encoding within an image encoder which is configured for non-embedded encoding.

14. An apparatus as recited in embodiment 1, further comprising programming executable on said computer for performing the adaptive entropy encoding within an image encoder which is configured for embedded encoding, in which encoding is performed across any desired number of bit planes and can be stopped at any desired coding rate.

15. An apparatus as recited in embodiment 1, wherein said coding is performed to a desired coding rate in response to fitting within a bit-budget for an encoded image stream.

16. An apparatus as recited in embodiment 1, wherein said transform comprises a spectral transform.

17. An apparatus as recited in embodiment 1, wherein said transform comprises either a discrete wavelet transform (DWT) or a discrete cosine transform (DCT), or any overlapped transforms.

18. A system for adaptive entropy encoding and decoding of images, comprising: an encoder having a processing element and memory configured for image encoding; programming executable on said encoder processing element for performing steps comprising, dividing an image or a video frame into blocks, decorrelating each block using a transform, quantizing the transform coefficients, selecting a tree structure from a set of multiple candidates in response to determination of geometric relationships within the block for the image, and encoding the block using clustering of zero coefficients in response to the selected tree structure; wherein a portion of the zero coefficients are eliminated from the encoded output in response to having non-leaf nodes of said selected tree structure represent that respective leaf nodes contain only zero coefficients and not coding these descendent leaf nodes into an output bit stream directed to a decoder; a decoder having a processing element and memory configured for image decoding of the image stream from said encoder; programming executable on said decoder processing element for outputting an image signal in response to performing steps comprising, determining the tree structure selected by said encoder in encoding the block, decoding leaves of the tree structure into coefficients of an output, outputting zero coefficients within the output in response to decoding non-leaf nodes without non-zero branches, performing dequantizing of the output, performing an inverse transform of the output, reconstructing the image signal in response to receipt of the output.

19. A system as recited in embodiment 18, wherein said encoding of the block is performed in response to the selected tree structure according to a predetermined traversal of the tree structure.

20. A method for adaptive entropy encoding within an image encoder, comprising: dividing an image or a video frame into blocks; decorrelating each block using a spectral transform; quantizing the transform coefficients; selecting a tree structure from multiple candidates in response to determination of two-dimensional geometric relationships within the block for the image; and encoding the block while clustering zero coefficients in response to the selected tree structure; wherein a portion of the zero coefficients are eliminated from the encoded output in response to having non-leaf nodes of said selected tree structure represent that their respective leaf nodes contain only zero coefficients.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for adaptive entropy encoding within an image encoder, comprising:
a computer configured for image encoding;
memory coupled to said computer; and
programming executable on said computer for performing steps comprising:
dividing an image into blocks,
decorrelating each block using a transform,
quantizing the transform coefficients,
selecting a desired tree structure from multiple candidates in response to determination of geometric relationships within the block of coefficients for the image, and
encoding the block using clustering of zero coefficients in response to the selected tree structure;
wherein a portion of the zero coefficients are eliminated from the encoded output in response to having non-leaf nodes of said selected tree structure represent that respective leaf nodes contain only zero coefficients and not coding these descendent leaf nodes into an encoded output bit stream generated by said apparatus.

2. An apparatus as recited in claim 1, wherein said encoding of the block is performed in response to the selected tree structure according to a predetermined traversal of the tree structure.

3. An apparatus as recited in claim 1:
wherein said tree structure has leaf and non-leaf nodes in a specified arrangement; and
wherein one or more leaf nodes containing coefficients are associated with each non-leaf node.

4. An apparatus as recited in claim 1, wherein the state of each non-leaf node is represented by a bit indicating whether its descendent leaf nodes contain all zero coefficients, or do not contain all zero coefficients.

5. An apparatus as recited in claim 1, wherein a set of tree structures are retained in the encoder and configured for allowing one of the tree structures to be selected in response to said selection of tree structure.

6. An apparatus as recited in claim 1, wherein said geometric relationships which can be recognized within the blocks are selected from the group of geometric block relationships consisting of flat, noisy, horizontal, vertical, diagonal +45°, diagonal −45°, L-shaped, and square.

7. An apparatus as recited in claim 1, further comprising performing a Haar transform prior to decorrelation of the block.

8. An apparatus as recited in claim 1, further comprising providing information to a decoder about which transform was used when decorrelating blocks of the image.

9. An apparatus as recited in claim 1, further comprising providing information to a decoder about which tree structure was selected for use in coding each block of the image.

10. An apparatus as recited in claim 1:
    Wherein information is provided to a decoder about which tree structure was selected for use in coding each block of the image; and
    wherein said information comprises at least one index for said selected tree structure to a decoder configured for receiving the encoded image.

11. An apparatus as recited in claim 1, wherein said geometric relationship comprises a two-dimensional relationship between the coefficients in the current block being coded.

12. An apparatus as recited in claim 1, further comprising inter-block prediction or pre-filtering of the block prior to transformation.

13. An apparatus as recited in claim 1, wherein said block can be of any desired shape and size, including block sizes selected from the group of block sizes consisting of 4×4, 8×8 and 16×16, 32×32 coefficient blocks.

14. An apparatus as recited in claim 1, further comprising performing the adaptive entropy encoding within an image encoder which is configured for non-embedded encoding.

15. An apparatus as recited in claim 1, further comprising performing the adaptive entropy encoding within an image encoder which is configured for embedded encoding, in which encoding is performed across any desired number of bit planes and can be stopped at any desired coding depth.

16. An apparatus as recited in claim 1, wherein said coding is performed to a desired coding depth in response to fitting within a bit-budget for an encoded image stream.

17. An apparatus as recited in claim 1, wherein said transform comprises either a spatial transform or a spectral transform.

18. An apparatus as recited in claim 1, wherein said transform comprises either a discrete wavelet transform (DWT) for spatial transformation, or a discrete cosine transform (DCT) for spectral transformation.

19. A system for adaptive entropy encoding and decoding of images, comprising:
    an encoder having a processing element and memory configured for image encoding;
    programming executable on said encoder processing element for performing steps comprising:
        dividing an image into blocks,
        decorrelating each block using a transform,
        quantizing the transform coefficients,
        selecting a tree structure from a set of multiple candidates in response to determination of geometric relationships within the block of coefficients for the image, and
        encoding the block using clustering of zero coefficients in response to the selected tree structure;
    wherein a portion of the zero coefficients are eliminated from the encoded output in response to having non-leaf nodes of said selected tree structure represent that respective leaf nodes contain only zero coefficients and not coding these descendent leaf nodes into an output bit stream directed to a decoder;
    a decoder having a processing element and memory configured for image decoding of the image stream from said encoder;
    programming executable on said decoder processing element for outputting an image signal in response to performing steps comprising:
        determining the tree structure selected by said encoder in encoding the block,
        decoding leaves of the tree structure into coefficients of an output,
        outputting zero coefficients within the output in response to decoding non-leaf nodes without non-zero branches,
        performing dequantizing of the output,
        performing inverse transformation of the output,
        reconstructing the image signal in response to receipt of the output.

20. A method for adaptive entropy encoding within an image encoder, comprising:
    dividing an image into blocks within an encoder computer processor;
    decorrelating each block within the encoder computer processor using a spatial or spectral transform;
    quantizing the transform coefficients within the encoder computer processor;
    selecting a tree structure from multiple candidates within the encoder computer processor in response to determination of two-dimensional geometric relationships within the block of coefficients for the image; and
    encoding the block within the encoder computer processor while clustering zero coefficients in response to the selected tree structure;
    wherein a portion of the zero coefficients are eliminated from the encoded output in response to having non-leaf nodes of said selected tree structure represent that their respective leaf nodes contain only zero coefficients.

* * * * *